Patented Mar. 8, 1938

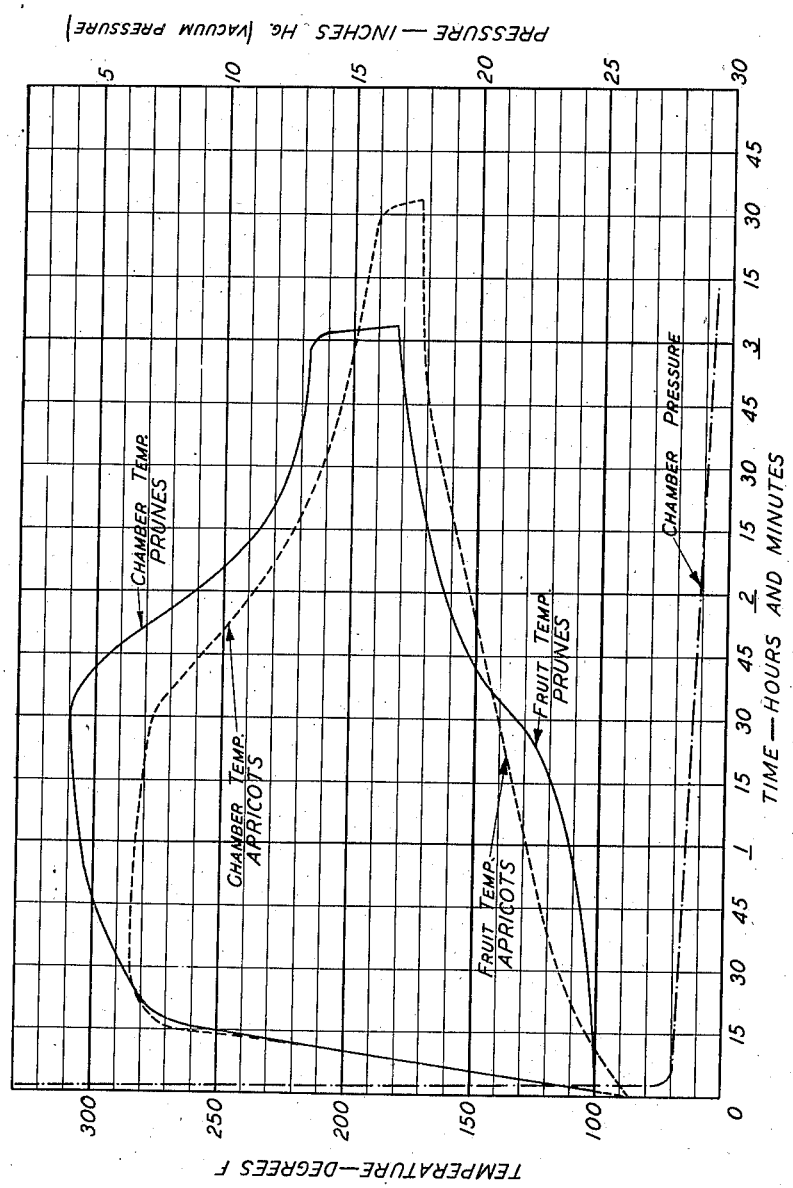

2,110,821

UNITED STATES PATENT OFFICE 2,110,821

PROCESS FOR DEHYDRATING FRUIT

James C. Rea and Earl N. Percy, Oakland, Calif., assignors to Dry Fruit Products Company, Oakland, Calif., a corporation of California Application August 3, 1936, Serial No. 93,952

5 Claims. (Cl. 99—204)

The invention relates to processes for drying or dehydrating fruit and other food products and more particularly to such processes as disclosed in the patents to Charles C. Moore, Numbers 1,543,948 and 2,023,536 issued June 30, 1925 and December 10, 1935 respectively, and in co-pending applications of Earl N. Percy, Serial No. 56,083 and 56,261 filed December 24, 1935 and December 26, 1935, respectively.

As disclosed in the Moore patents, above referred to and particularly No. 1,543,948, Moore found that it was possible by proper processing to dehydrate ordinary fresh and commercially dried fruit to a point reducing the fruit to substantially an anhydrous crystalline form containing only the fruit sugar, mineral matter and the fruit tissue. This product as expressed by Moore is a most tasty and useful food product and has the special advantage of lightness in weight and greater preservative qualities than the original fruit without any material change of fruit flavor.

More specifically in the development of this product, the various processes used generally required the maintenance of drying temperatures which were below the charring or decomposition temperature of the fruit sugars. We have now found that by properly treating the fruit initially the entire fruit mass may be caused, in drying, to substantially follow the boiling point curve of the aqueous solution in the fruit. The important advantage of such arrangement is that the fruit, as a whole, will be of substantially the same temperature and that within limits substantially no portion of the fruit may exceed a certain temperature depending upon the concentration of the aqueous solution in the fruit. With such a condition it is possible to subject the fruit to temperatures very considerably in excess of the charring temperatures of the fruit sugar to accelerate the dehydration of the fruit without endangering the fruit itself.

This decrease in drying time, may not only considerably reduce the cost of producing the dehydrated product, but also improves the quality of the product in that the faster drying produces a harder and more crunchy structure than does the slow longer drying.

In addition to the advantages and features of the present process, above outlined, other objects and features will appear from the following description of the preferred form of the invention. It is to be understood, however, that we do not limit ourselves to said description, as we may adopt variations therefrom within the scope of the invention as set forth in the claims.

The drawing accompanying and forming part of the specification is a chart illustrating the control of temperatures of the drying chamber and fruit and also the pressure in the drying chamber during the dehydration of the fruit.

In accordance with the process of the present invention, the fruit is initially reduced to a substantially homogeneous state. In this regard, the various fruits require different treatment. In most cases we prefer to start with commercially dried fruit and grind the same into a finely comminuted mass. In the case of some other fruits, however, such as apples, bananas and others, a substantially homogeneous state is produced by merely cutting the fruit into relatively large sized pieces. After the original fruit has been so treated, the same is preferably spread on pans and inserted in a suitable drying chamber wherein the chamber temperature and pressure may be accurately and closely controlled.

For the purpose of illustration, the fruits here selected, are prunes and apricots, and as will be hereinafter noted, substantially all of the other fruits when processed in accordance with the present invention may be dried by temperatures and pressures falling within the zone defined by these two fruits. In the case of prunes and apricots, we prefer to first grind or otherwise reduce the fruit into a paste-like form and then spread the fruit-mass on to relatively large trays in a thickness of approximately one-half inch. A single, or several trays, may then be inserted in the drying chamber, as above mentioned, and the chamber is then evacuated to a pressure preferably less than a vacuum gauge reading of 20 inches of mercury. As an important feature of the present invention, this reduction in pressure very substantially lowers the boiling point of the aqueous solution in the fruit and since the latter is reduced to substantially a homogeneous state the temperature of the same will be controlled by the boiling point temperature of such aqueous solution. More specifically, the pressure in tne chamber is reduced sufficiently to lower the boiling point temperature of such aqueous solution below the temperature at which the fruit sugar will char or decompose. With such a pressure condition established the chamber temperature may be raised to substantially exceed this charring temperature without danger to the fruit, as the temperature of the latter is maintained low by the relatively low boiling temperature of the moisture in the fruit.

As illustrated in the accompanying chart, we prefer to use substantially as low a pressure in the drying chamber as is commercially feasible which, as indicated, is between approximately 28 and 29.9 inches of mercury on the vacuum gauge during the drying of the fruit, the lower pressure being more readily obtainable towards the end of the drying cycle due to the decreased rate of evaporation of the moisture in the drying chamber. In the case of prunes, the chamber temperature is initially raised to substantially 300° F. during substantially the first 1½ hours of drying, during which time, it will be noted, the fruit temperature gradually increases with the decrease of moisture in the fruit. At approximately 1½ hours a critical point is reached in the drying cycle when the fruit temperature begins to more actively respond to the chamber temperature due to the increased dryness of the fruit, and at this time the chamber temperature is uniformly and fairly rapidly reduced during the following three-fourths of an hour to substantially 240° F. to 245° F. As indicated on the chart, the fruit temperature increases during this period notwithstanding the substantial reduction in the chamber temperature. At the end of approximately 2¼ hours the chamber temperature is further gradually reduced during the following three-fourths of an hour into a zone of 210° F. to 220° F., while the fruit temperature is gradually increased to approximately 180° F. to 190° F. at the end of this period. At this time the fruit is reduced to sufficient dryness and any further heating would cause a sudden rise in fruit temperature and charring of the fruit sugar. Accordingly, when the present process is followed, the chamber temperature is rapidly reduced at the end of substantially three hours to prevent any decomposition of the fruit sugar. It will be observed that while the charring or decomposition temperature of fruit sugar is below 200° F. the chamber temperature during substantially the entire process is well above this amount. During the initial drying period, the chamber temperature is maintained approximately 100° F., in excess of the charring or decomposition point of fruit sugar without danger to the fruit, since, as will be observed, the latter during said period is maintained under 150° F. Since the temperature differential between the chamber and the fruit determines the rate of heat transfer to the fruit and the rate of evaporation of moisture from the fruit, it is desirable that this differential be maintained throughout the process as high as possible. However, repeated tests have shown that this differential has very definite limits in the case of various fruits to prevent charring of the fruit notwithstanding the maintenance of a relatively low boiling temperature of the aqueous solution in the fruit. The present process has been carefully calculated and developed by these tests to enable chamber temperatures at substantially the critical maximum during the entire drying process.

Prunes are one of the tougher species of fruit and less sensitive to heat treatment than most other fruits, and accordingly with the present process it is possible to reduce the comminuted prune meat to a substantially anhydrous form in approximately 3 hours, whereas under previous processes substantially double and greater than this time was required. This increased rate of drying further has a very noticeable effect on the structure of the fruit, in that the more rapid rate of drying produces a harder and crunchier product than that heretofore obtainable.

Contrasted to prunes, apricots represent one of the more sensitive species of fruit, and, as will be noted from the accompanying chart, the chamber temperature maintained is substantially lower and the fruit temperature is more responsive to changes in the chamber temperature than in the case of prunes. As indicated on the chart, the chamber temperature for drying apricots is maintained between 270° F. and 290° F. for the first one and a half hours, during which time the fruit temperature increases gradually to approximately 140° F. During the following portion of the drying cycle, the chamber temperature is first fairly rapidly reduced during substantially the following 45 minutes when the same is lowered to approximately 220° F. and then is gradually reduced to substantially 190° F. at the end of 3½ hours when the process is terminated. As will be noted from the chart, the fruit temperature responding to this varying chamber temperature gradually increases to substantially 170° F. at the end of two and three-fourths hours of drying, and then levels off and almost imperceptibly increases during the last half hour of drying.

The critical curves for substantially all other fruits, and particularly dates, figs, peaches, raisins, apples, berries, bananas, and others, fall between the curves illustrated for prunes and apricots so that the latter curves define a working zone for the various fruits.

Of particular importance in the present process is the maintenance of relatively high chamber temperatures during an initial period of dehydration of the fruit following which an inverse relationship between the chamber and fruit temperatures is established.

Of further importance is the gradual approach of the chamber and fruit temperatures towards the end of the drying period produced by the very gradual leveling off or controlled asymptotic extension of the chamber temperature curve into the final temperature zone.

We claim:

1. The process of dehydrating fruit which consists in placing the fruit in one or more layers in an atmosphere of reduced pressure of approximately 20 to 29.9 inches of mercury to lower the boiling point of the aqueous solution in the fruit to below the charring temperature of the fruit sugars, applying heat to said atmosphere of approximately 250° F. to 325° F. for approximately 1½ hours, reducing the applied heat gradually for the following 1½ hours to approximately 175° F. to 225° F. and maintaining said latter temperature until the fruit is substantially completely dehydrated, the thickness of said fruit layer or layers being about ½ inch depending upon the temperature aforesaid.

2. The process of dehydrating fruit which consists in placing the fruit in one or more layers in an atmosphere of reduced pressure of approximately 20 to 29.9 inches of mercury, applying heat to said atmosphere of approximately 250° F. to 325° F. for approximately 1½ hours, reducing the applied heat with substantial uniformity to approximately 220° F. to 230° F. during the following ¾ hour, then gradually reducing the applied temperature asymptotically to a zone of 175° F. to 225° F. and maintaining said latter temperature until the fruit is substantially completely dehydrated, the thickness of said fruit layer or layers being about ½ inch depending upon the temperature aforesaid.

3. The process of dehydrating fruit which consists in placing the fruit in one or more layers in an atmosphere of reduced pressure of approximately 20 to 29.9 inches of mercury, applying heat to said atmosphere of approximately 250° F. to 325° F. for approximately 1½ hours, reducing the applied heat with substantial uniformity to approximately 220° F. to 230° F. during the following ¾ hour, then gradually reducing the applied temperature to a zone of 175° F. to 225° F. during the following ¾ hour, the thickness of said fruit layer or layers being about ½ inch depending upon the temperature aforesaid.

4. The process of dehydrating prunes or apricots which consists in reducing the prunes or apricots to paste form and in placing the layer or layers of the prunes or apricots in an atmosphere of reduced pressure of approximately 20 to 29.9 inches of mercury to lower the boiling point of the aqueous solution in the fruit to below the charring temperature of the fruit sugars, applying heat to said atmosphere of approximately 250° F. to 325° F. for approximately 1½ hours, reducing the applied heat gradually for the following 1½ hours to approximately 175° F. to 225° F. and maintaining said latter temperature until the fruit is substantially completely dehydrated, the thickness of said fruit layer or layers being about ½ inch depending upon the temperatures aforesaid.

5. The process of dehydrating apples which consists in cutting the fruit into pieces and placing such pieces in one or more layers in a chamber of reduced pressure of approximately 20 to 29.9 inches of mercury to lower the boiling point of the aqueous solution in the fruit to below the charring temperature of the fruit sugars, applying heat to said chamber of approximately 250° F. for approximately one and one-half hours, reducing the applied heat gradually for approximately the following one and one-half hours to approximately 175° F. and maintaining said latter temperature until the fruit is substantially completely dehydrated, the thickness of said layer or layers of cut apples being about one-half inch depending upon the temperatures aforesaid.

JAMES C. REA.
EARL N. PERCY.